(12) United States Patent
Rosse (10) Patent No.: US 6,330,850 B1
(45) Date of Patent: Dec. 18, 2001

(54) DEVICE FOR PREPARING BEVERAGES FROM WATER-RECONSTITUTABLE FOODSTUFFS

(75) Inventor: Meinrad Rosse, La Tour-de-Peilz (CH)

(73) Assignee: Nestec S.A., Vevey (CH)

( * ) Notice: Subject to any disclaimer, the term of this patent is extended or adjusted under 35 U.S.C. 154(b) by 0 days.

(21) Appl. No.: 09/658,653

(22) Filed: Sep. 8, 2000

(30) Foreign Application Priority Data

Nov. 23, 1999 (EP) .................................................. 99203922

(51) Int. Cl.[7] ...................................................... A47J 31/00
(52) U.S. Cl. ........................... 99/289 R; 99/290; 99/295; 222/129.1; 222/129.3; 241/282
(58) Field of Search ............................... 99/289 R, 289 T, 99/290, 295; 222/129.1, 129.3, 129.4; 241/282, 230, 237

(56) References Cited

U.S. PATENT DOCUMENTS

| | | | |
|---|---|---|---|
| 281,686 | * | 7/1883 | Gonzales .............................. 241/282 |
| 635,436 | * | 1/1899 | Fritz ..................................... 241/282 |
| 2,075,522 | * | 3/1937 | Hughes ................................ 241/282 |
| 2,977,203 | | 3/1961 | Sienkiewicz et al. . |
| 3,615,669 | | 10/1971 | Hair et al. ................................ 99/71 |
| 3,716,373 | | 2/1973 | Rhodes et al. ............................ 99/71 |
| 4,165,045 | * | 8/1979 | Hager et al. .......................... 241/282 |
| 4,368,100 | | 1/1983 | Pyves et al. .......................... 159/48.1 |
| 4,474,820 | | 10/1984 | Hawes et al. ......................... 426/387 |
| 4,594,257 | | 6/1986 | Leblanc et al. ....................... 426/594 |
| 4,594,258 | | 6/1986 | Vitti et al. ............................. 426/594 |
| 4,794,010 | | 12/1988 | Jones et al. ........................... 426/387 |
| 5,237,910 | | 8/1993 | Chigira .................................. 99/282 |
| 5,542,342 | * | 8/1996 | McNeill et al. .................. 99/289 X |

FOREIGN PATENT DOCUMENTS

| | | |
|---|---|---|
| 0 516 168 A2 | 12/1992 | (EP) . |
| 2583306 A | 12/1986 | (FR) . |
| 1276437 | 6/1972 | (GB) . |
| 2006603 | 5/1979 | (GB) . |
| 10211105 | 11/1998 | (JP) . |

\* cited by examiner

Primary Examiner—Reginald L. Alexander
(74) Attorney, Agent, or Firm—Winston & Strawn (57) ABSTRACT

The invention relates to a method and a device for the on demand preparation of beverages or sauces from water-dispersible foodstuffs. The device includes one or more pressing units that urge one or more solid refills of a water-dispersible foodstuff towards one or more abrading devices so that the refill contacts the abrading device and the abrading device abrades the refill to provide an amount of powdered foodstuff that is collected in a collector and combined with water to provide the beverage. The invention also relates to a refills for use in the device of the invention and a process for manufacturing the refills.

12 Claims, 9 Drawing Sheets

DEVICE FOR PREPARING BEVERAGES FROM WATER-RECONSTITUTABLE FOODSTUFFS

TECHNICAL FIELD

The invention relates to the on demand preparation of beverages or sauces from water-dispersible foodstuffs. More specifically, the invention relates to automatic dispensing devices for preparing the beverages or sauces, refills for use in the dispensing device, and a method of manufacturing therefills.

BACKGROUND ART

It is a known practice to prepare beverages from pulverulent compositions based on coffee, cocoa, or the like in automatic dispensers. The process involves mixing a specified amount of a powder with a specified volume of cold or hot water to reconstitute a beverage. In general, the powder is stored "in bulk" in one or more reservoirs located in the upper part of the dispenser. The powder is collected in a hopper which is a downward extension of the reservoir and a metering device, such as a metering screw, is positioned horizontally downstream of the hopper to supply the desired amount of powder to be mixed with water on demand of the user. The powder and the water are typically mixed directly in the beverage container or in an intermediate mixing bowl. The beverage is then dispensed for consumption by the user.

This method of preparing beverages, however, has numerous drawbacks. For example, the dispensers need to be regularly supplied with the pulverulent powder which requires pouring the powder into the reservoirs by tipping a container of the powder. This method of loading is not very practical, is non-hygienic, and takes a long time to perform. In addition, in order for the device to have a sufficient service capacity, relatively large volumes of powder are held in the reservoir, which requires a relatively bulky dispensing device. A large dispensing device can be a major drawback especially when the dispenser needs to be used in tight spaces, such as when the dispensers are installed in the catering service of public transportation facilities such as aircraft, trains, and the like.

The powdered products are also highly sensitive to heat and moisture while they are in storage and lumps of product often tend to form that can lead to problems with metering and/or the dispensing device becoming blocked. Similarly, powdered compositions typically undergo oxidation quickly because the powdered or agglomerated granular product has a relatively large surface area that is in contact with ambient air. Oxidation results in a loss of flavor and freshness.

Another drawback with known dispensing devices is the production of "fines" that result when agglomerated solids, such as those based on coffee, for example, become disagglomerated. These "fines" form a dust that tends to settle out and accumulate at the bottom of the hoppers or reservoirs. The accumulation of "fines" makes metering less accurate. Regular maintenance is therefore required in order to clean the machine. This results in significant waste of raw material.

Yet another drawback with known dispensing devices results from the absence of a physical correspondence or tailoring between the powdered composition and the dispensing device, so that the powdered composition that is intend to be used in the device can be substituted for by any arbitrary type of powdered composition, which may be of inferior quality. Thus, the quality of the final product is difficult to control and the consumer can no longer be assured of obtaining a quality product.

U.S. Pat. No. 5,237,910 relates to a beverage dispenser that feeds powder or granules into a hopper from storable cartridges. The cartridges are opened by mechanical means such as knives. Such a system, however, has many of the drawbacks associated with the storage and feed of pulverulent foodstuffs in conventional dispensers.

There remains a need for improved methods of preparing and dispensing, on demand, beverages or sauces from water-dispersible foodstuffs.

SUMMARY OF THE INVENTION

The present invention is directed to a device for preparing beverages. The device includes one or more pressing units for urging one or more solid refills of a water-dispersible foodstuff along a guide surface that directs the refill in a first direction along a first axis towards one or more abrading devices so that the refill contacts the abrading device and the abrading device abrades the refill to provide an amount of powdered foodstuff, a collector to collect the powdered foodstuff, and a liquid supply to provide one or more liquids to be mixed with the powdered foodstuff.

The abrading device may be a rotary element comprising an abrading surface that is substantially cylindrical in shape with an axis of rotation that is substantially perpendicular to the first direction. The rotary element may have a diameter of 25 to 35 mm and rotates at between about 200 and 2060 rotations per minute. The guide surface may be positioned above the axis of rotation of the rotary element. In another embodiment the abrading device may have a planar surface provided with a rectlinear motion that is substantially perpendicular to the first direction. The rectlinear motion may be provided by an abrasion strip supported by rollers.

The device may also include a feed unit for continually providing a refill to the pressing unit. The feed unit may be positioned adjacent to the pressing unit to provide a refill onto the guide surface along the first axis after the pressing unit has retreated by a sufficient length so that a refill can be positioned between the pressing unit and the abrading device. The feed unit may include a reservoir and a transverse pushing member, wherein the reservoir is capable of containing one or more refills stacked vertically on top of each other and aligned substantially parallel to and adjacent to the first direction and having an opening to allow the lowermost refill in the vertical stack to be urged by the transverse pushing member in a second direction perpendicular to the first direction to position the lowermost refill on the guide surface along the first axis. The device may also include a detection element to determine when the pressing unit has retreated by a sufficient length.

The collector may be a removable serving container or the device may further include a mixing chamber to mix the powdered foodstuff and the liquid before the powdered foodstuff and liquid is deposited in the collector.

The invention is also directed to a method for preparing a beverage. The method involves the steps providing a solid refill of a water-dispersible foodstuff in solid form having a length, mechanically abrading the refill with an abrading device to release an amount of abraded foodstuff, collecting the abraded foodstuff in a collector, and combining the abraded foodstuff with a liquid to provide a beverage. The amount of abraded foodstuff may be determined by measuring the mass of abraded foodstuff collected in the collector or may be determined by measuring a reduction in the length of the refill.

The invention is also directed to a refill of a pulverulent foodstuff that can be dispersed in a liquid medium that has been compacted into a solid form that can be abraded to form powdered granules, flakes, or chips. The refill may be in the form of a bar, stick, pellet, plug, or tablet. In one embodiment the refill is parallelepipedal shape, has a mass of from about 10 to 200 g, and a mass per unit volume of between about 0.75 and 1.65 g/cm$^3$. The pulverulent foodstuff may be one or more of compositions based on powdered or agglomerated concentrates of soluble coffee, cocoa, milk, chicory, soups, or sauces. The foodstuff may be a coffee powder obtained from atomized coffee and have a mass per unit volume of from about 200 to 250 g/liter and a moisture content of from about 3.5 to 5 percent. The refill may also be a fruit containing composition.

The invention is also directed to a method of manufacturing a refill of water-dispersible material. The method involves the steps of providing an amount of a pulverulent foodstuff in a mold, applying sufficient pressure to the pulverulent foodstuff for sufficient time to compact the pulverulent foodstuff and form a solid refill; and releasing the solid refill from the mold. The method may also include a step of heating the pulverulent foodstuff. The pulverulent material may be heated to a temperature of between about 20 and 80° C. The pressure may be between about 20 and 50 Mpa. The pressure may be sufficient to provide a compression factor of from about 3 to 5 or sufficient to provide a refill having a mass per unit volume of between about 0.75 and 1.65 g/cm$^3$.

A second method of manufacturing a refill includes the steps of extruding a pulverulent foodstuff to provide a continuous strip that exits the extruder in a first direction, rolling the continuous strip between rollers oriented in at least two directions that are perpendicular to the first direction to form a rolled strip having a substantially uniform mass per unit volume, and cutting the continuous strip into sections to provide the refill.

DETAILED DESCRIPTION OF THE PREFERRED EMBODIMENTS

The invention relates to the on demand preparation of beverages and sauces from water dispersible foodstuffs. The beverage may be, for example, a beverage based on coffee, chocolate, milk, broths or soups, culinary sauces, or other similar foodstuff.

In particular, the invention provides a drink dispensing device for receiving one or more refills of a foodstuff in solid compact form comprising at least one abrading device, at least one pressing device that exerts a force on the refill to push the refill against the abrading device so that a determined amount of foodstuff is cut or abraded from the refill in a powdered form, and a collector to collect the abraded foodstuff.

The volume of the foodstuff in the solid compact refill of the invention is less than the volume of an equivalent amount of foodstuff in a powdery or granular form. The device of the invention produces, on demand, only an amount of foodstuff in powdered form that is needed to make a single serving of a beverage by being dispersed in a liquid. Thus, the surface area of the foodstuff that comes into contact with the air is limited, oxidation of the foodstuff is minimized, and the flavor and aroma of the foodstuff is preserved and given off only at the time of preparation.

Figure 1:
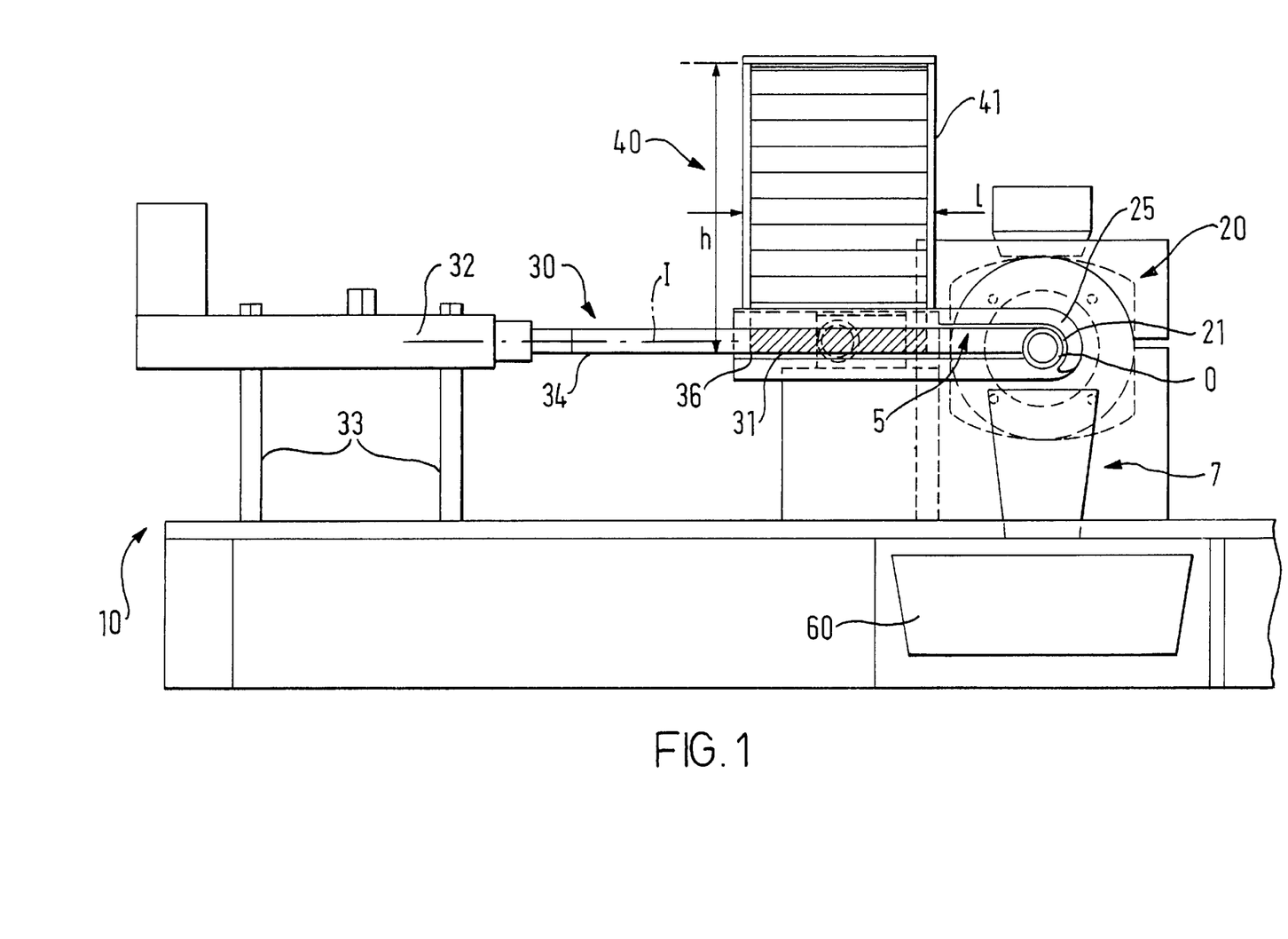
FIG. 1 depicts a side view of a device for preparing a beverage according to the invention.
Figure 2:
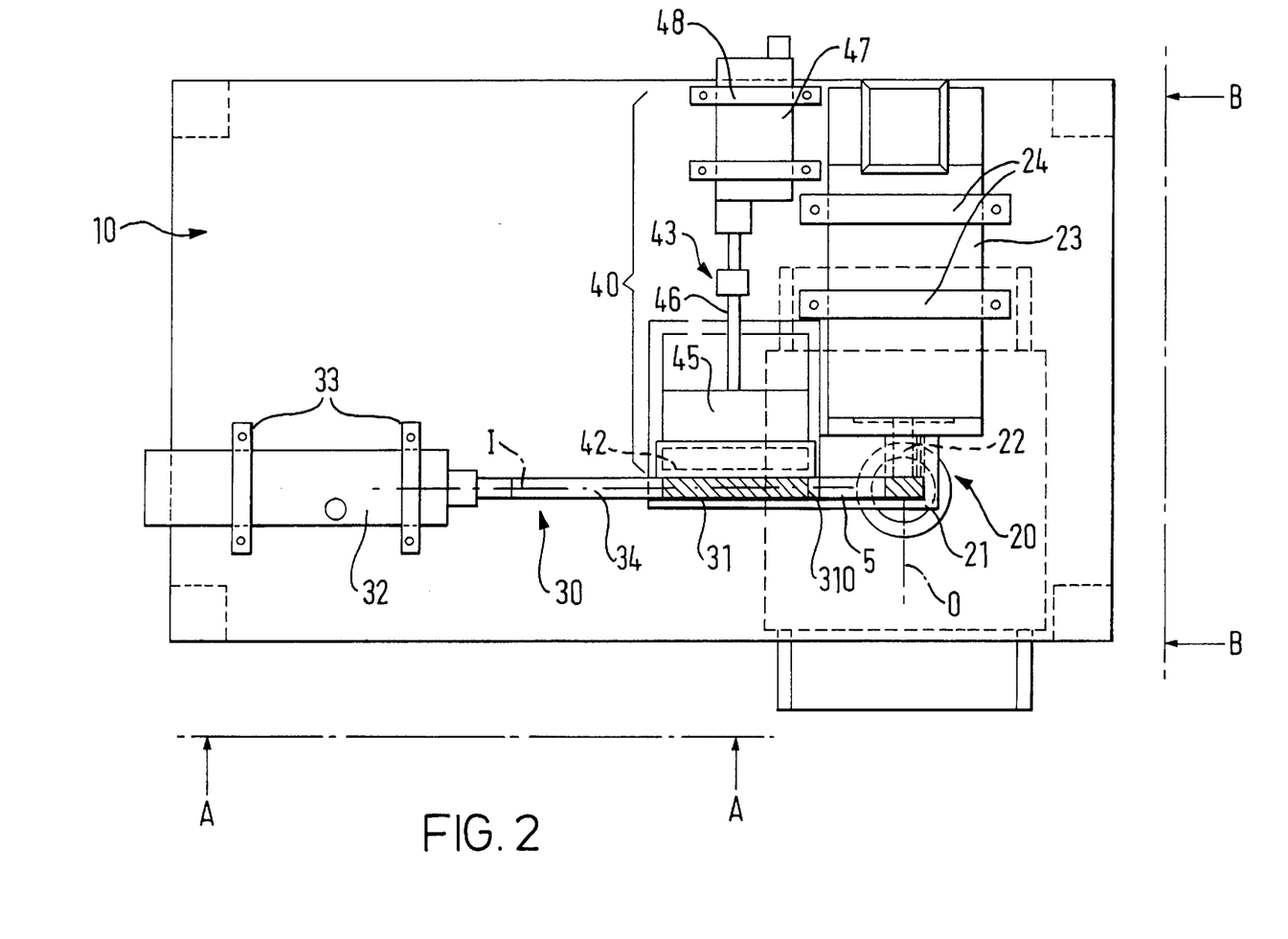
FIG. 2 is a top view of a device for preparing a beverage according to the invention.
Figure 3:
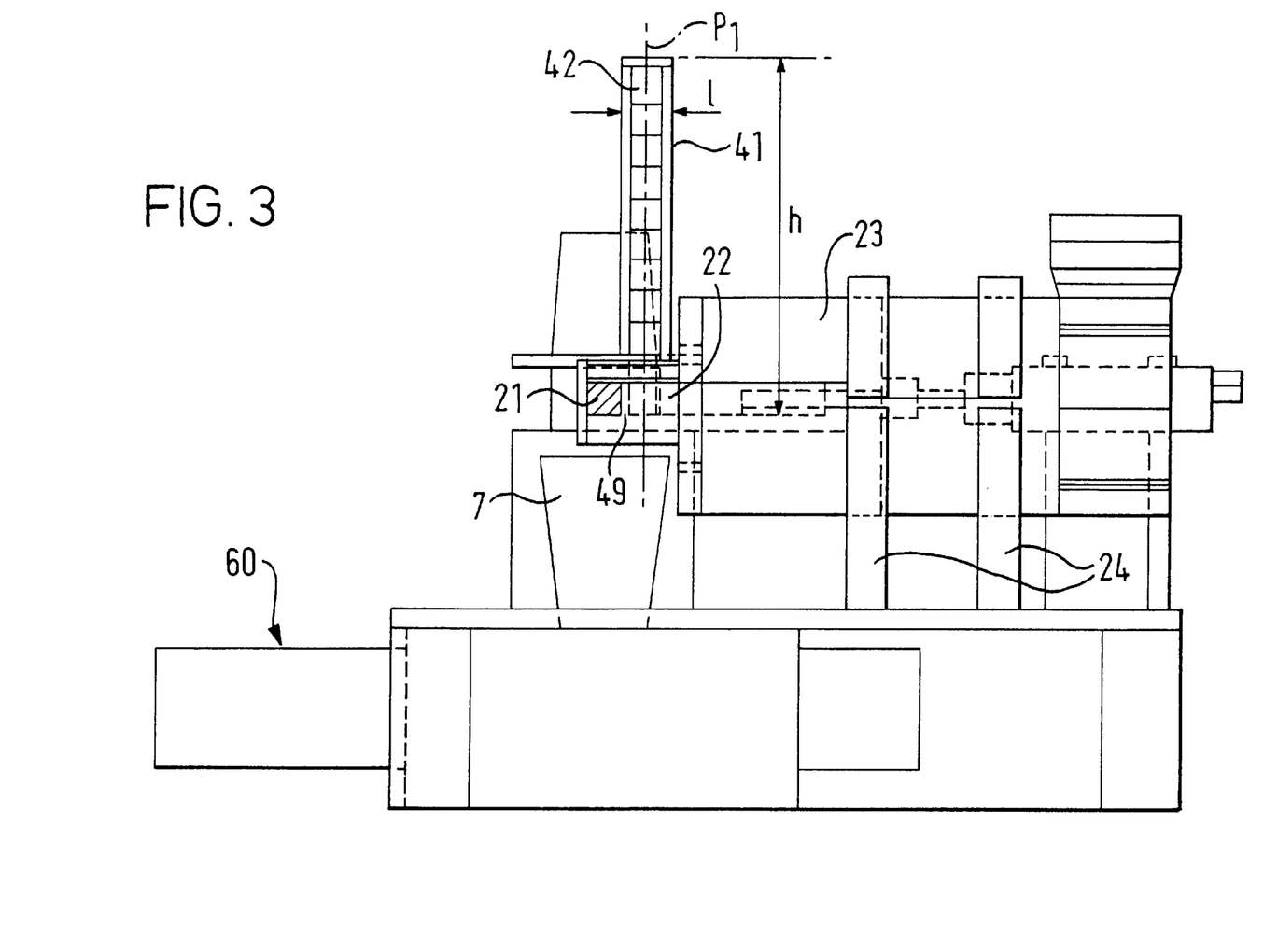
FIG. 3 is a front view of a device for preparing a beverage according to the invention.

The device for preparing beverages or sauces according to the invention is depicted in FIGS. 1 to 3. The device depicted in FIGS. 1 to 3 comprises the essential elements of the invention but deliberately omits certain functional elements which may form part of a conventional beverage dispenser, such as, for example, the cabinet, electrical power supply, control system, water supply, heating system, and the like. These have been omitted for reasons of simplification and for a better understanding of the invention.

The device of the invention comprises a chassis 10 on which is mounted an abrading device 20 and a pressing unit 30 that acts on a refill of foodstuff 5 to urge the foodstuff 5 towards the abrading device 20. When the refill 5 contacts the abrading device the refill is eroded into a powdered foodstuff. A feed and storage unit 40 supplies the pressing unit 30 with refills 5. A collector 7 is placed at the outlet of the abrading and cutting unit to collect the powdered foodstuff. The collector 7 may be a serving container, such as a cup, a mug, a bowl, or the like. A liquid is added to the collector 7 to reconstitute the foodstuff in the liquid. Optionally a mechanical stirring means may be provided to improve the mixing in the collector 7 prior to serving.

Stirring may also be accomplished in full or in part by adding the liquid to the collector 7 under pressure and by orienting the inlet of the liquid supply in relation to the collector 7 so as to encourage the creation of swirling movements within the collector.

In an alternative embodiment, not depicted, an intermediate part of the device is coupled to one or more abrading devices and the liquid supply to provide a mixing zone wherein the liquid and abraded foodstuff is mixed. The mixture is then deposited in the collector 7.

Figure 11:
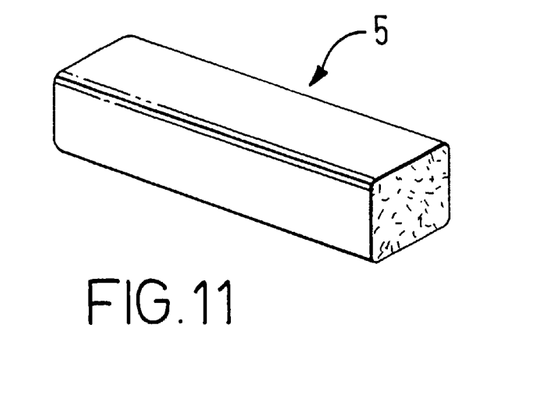
FIG. 11 is a profile view of the refill obtained according to the method of manufacturing a refill depicted in FIGS. 8 to 10.
Figure 12:
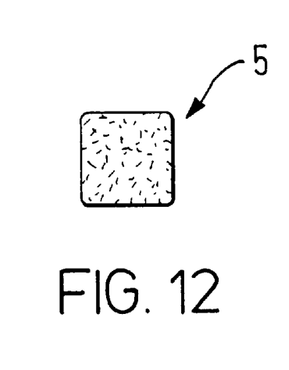
FIG. 12 is a front view of the refill obtained according to the method of manufacturing a refill depicted in FIGS. 8 to 10.

The device is supplied with refills 5. Refills 5 are based on reconstitutable foodstuffs. The refills 5 are in the form of solid, individual bars or sticks illustrated by way of example in FIGS. 11 and 12. Preferably the refills are of parallelepipedal shape and have a mass of from about 10 to 200 grams and more preferably from about 15 to 50 grams. Of course the shape and dimensions of the refills may vary greatly according to the specific machine and its capacity, or according to the nature and characteristics of the foodstuff.

The abrading device 20 typically comprises a cutting or abrading element of the rotary type 21, which is mounted on a rotation spindle 22 having an axis of rotation "O" and connected to an electric motor 23. Electric motor 23 is secured to the chassis 10 by connecting means 24. The abrading element may have a cylindrical surface, or it may have a planar abrading surface. When the abrading element has a planar surface the surface is provided with a rectilinear motion or a rotary motion. Rectilinear motion can be provided, for example, by an abrading strip supported by rollers. The strip may be moved back and forth or can have a continuous motion. The abrading surface may also be in the form of a disk that rotates. Preferably, the abrading or cutting element is in the form of a cylinder, the outer surface of which is structured in such a way as to exhibit teeth, fluting, striations, knurling, and the like. Preferably, the abrading element has a diameter of from about 25 to 35 mm and a rotational speed of from about 200 to 2060 revolutions per minute. FIGS. 1 to 3 depict a device with a cylindrical abrading element.

The pressing unit 30 urges the refill towards the abrading unit 20. The pressing unit comprises a piston block 31 connected by means of a pin 34 to a ram 32 which moves longitudinally and is electrically powered. Ram 32 is securely mounted on chassis by connecting elements 33. The piston block 31 acts to urge refill 5 in a direction that is substantially normal to the axis of rotation "O" of the cylindrical abrading element 21. The refill 5 is aligned along axis "I" when it is being urged toward the abrading element. The pushing force generated by the pressing unit is distributed over a transverse surface 310 of piston block 31 and surface 310 comes into contact with a complementary surface of the refill 5. The surface 310 is preferably a planar surface directed perpendicularly to axis "I."

The pushing force exerted on refill 5 by the pressing unit to urge the refill 5 towards the abrading element provides a determined feed rate. Preferably, the feed rate is constant. It is, however, within the scope of the invention for the piston block 31 to have a variable, progressive, or regressive feed rate. Preferably, the feed rate is at least about 65 mm/min. The amount of powdered foodstuff combined with the liquid to prepare the beverage corresponds to the amount of the refill 5 abraded or cut by the abrading unit 20, which is dependent on the distance covered by the refill 5 in the pressing unit 30 and the mass per unit volume of the refill 5.

The refill 5 engaged in the pressing unit 30 is arranged against a lower guide surface 36 of the pressing unit. The guide surface 36 is substantially horizontal and parallel to the axis "I" and allows the refill 5 to be guided along axis "I" toward the abrading unit 20 until the refill has been completely worn or abraded away from contact with the abrading unit 20. The surface 36 preferably comes flush with the surface of the rotary element 21 but leaving a minimum space on the order of a few tenths of a millimeter to a few millimeters. The width of the space between the surface 36 and the rotary element 21 is determined so as to allow only those particles of the desired size to pass through and to prevent excessively large particles from passing through. Particles of excessive size therefore remain in contact with the tool until they are ground up and converted into particles of a smaller size capable of passing through the space.

Figure 4:
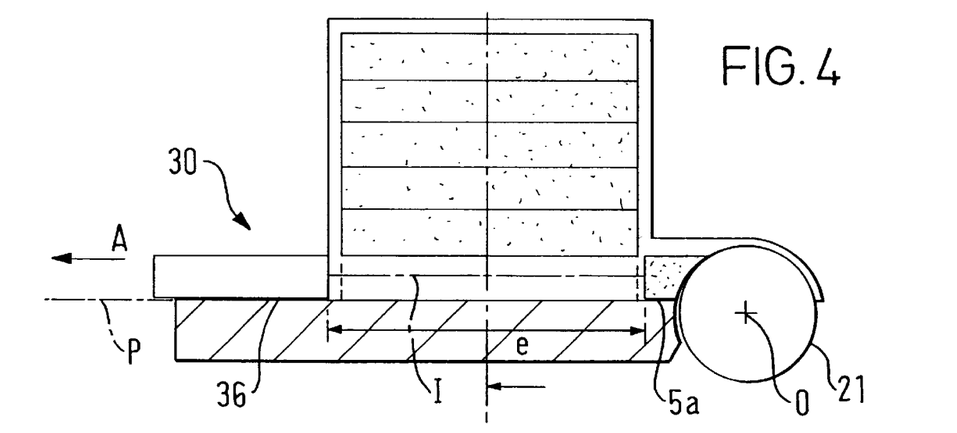
FIG. 4 is a diagrammatic side view of a device for preparing a beverage according to the invention depicting the first stage of feeding a refill into the device.

To ensure uniform release of residue without forming broken-off chunks or pieces larger in size than can be easily reconstituted with the liquid, it is important for the guide surface 34 to be located above the axis of rotation "O" of the rotary element 21, as shown more precisely in FIG. 4. Specifically, if the guide surface 36 extends below the axis "O," the surface of the refill 5 that is eroded by the rotary element 21 would have a weaker wedge-shaped trailing edge that would tend to break and release chunks or large pieces of foodstuff. Such large pieces could be difficult to disperse in the liquid and could undesirably increase the expected amount of foodstuff delivered to the collector 7.

The device according to the invention also comprises a feed unit 40 that constantly supplies the pressing unit 30 with refills 5 in order to guarantee constant metering of the foodstuff. A reservoir or loader 41 is arranged on the side of the pressing unit 30. The reservoir comprises a housing 42 extending roughly vertically in a plane P1 substantially parallel to the axis "I." The housing is sized to be able to accommodate a number of refills 5 in a vertical stack. The housing 42 has a length L that is slightly longer than the length of a refill 5, a width 1 slightly greater than the width of the refill 5, and a height h that is sufficient to allow more than 1 refill 5 to be stacked on top of each other.

The refill 5 is engaged by a pushing member 43 arranged on the side of the pressing unit. The pushing member 43 comprises a pushing block or piston block 45, connected to a rod 46 coupled to an electric ram 47. The electric ram is securely mounted on the chassis 10 by connecting means 48. The lower base of the reservoir 41 has an opening 49 in a plane "J" with dimensions large enough to allow the passage of a refill 5 and the piston block 45 in its transverse back and forth movements when reloading the pressing unit 30.

Figure 5:
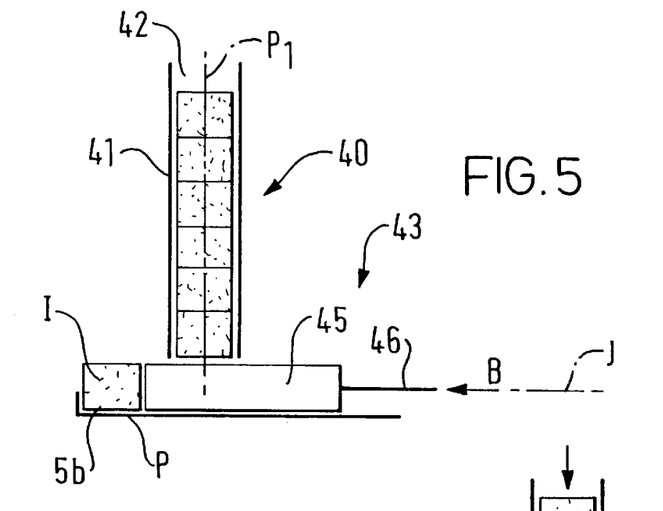
FIG. 5 is a diagrammatic front view of a device for preparing a beverage according to the invention depicting the second stage of feeding a refill into the device.
Figure 6:
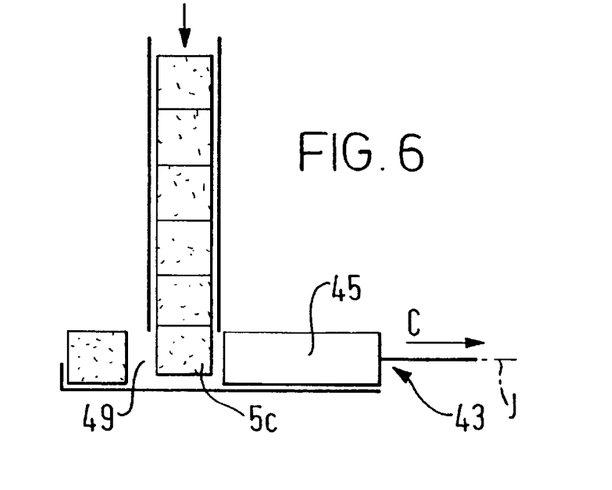
FIG. 6 is a diagrammatic front view of a device for preparing a beverage according to the invention depicting the third stage of feeding a refill into the device.

FIGS. 4 to 6 illustrates the feed cycle for feeding the device of the invention with refills. FIG. 4 depicts the stage in which a refill 5a has been worn down to a determined level. When the refill is worn down to a determined level, the pressing means is moved along axis "I" in a direction "A" longitudinally away from the abrading unit 21. The movement leaves a longitudinal space "e," of a length at least equivalent to the length of a new refill 5. FIG. 5 depicts the next stage in which the transverse pushing member 43 pushes a new refill 5b in a direction "B" parallel to horizontal surface P of guide surface 36 until refill 5b is oriented along axis "I." A ridge 50 in guide surface 36 along which refill 5b is pushed may serve to stop refill 5b in the desired position. The piston block 45 then occupies a position in the opening 49 that allows the refills stacked in the housing 42 of the loader to bear down on the piston block 45. The next stage, illustrated in FIG. 6, comprises returning the piston block 45 to its starting position by moving piston block 45 in direction "C. In this position, another fresh refill 5c is allowed to drop down so that it can occupy a position adjacent to the opening 49 before a new feed cycle is begun.

The feed cycle is initiated when pressing unit 30 detects that the current refill has been worn down to a desired level. Detection of the amount of wear may be performed by any means available to those of ordinary skill in the art. For example, proximity sensors can be arranged on the longitudinal piston block 31 and the chassis 10, or other fixed part of the device, to provide an indication of the relative forward position of the piston block 31. When longitudinal piston block 31 advances a predetermined distance the sensor on the piston block 31 and the chassis of the device 10 cross and a signal is emitted and sent to central control unit that then commands the feed cycle to start. It is understood that feed occurs constantly without interruption to the abrading cycle. A new refill 5b is aligned between the piston 31 and the refill 5a before refill 5a has been completely abraded. Thus, there is uninterrupted, continuous, and constant metering of the foodstuff over time.

In another embodiment the electric ram 47 of the loading unit 40 may be replaced by an electromagnet type operating system that operates on the two-position principle, i.e., a retracted position in which the piston block is outside the reservoir, and an engaged position in which the piston block is introduced into the reservoir.

The amount of foodstuff abraded or cut by the abrading unit 20 may be controlled in various ways. For example, the amount of abraded foodstuff can be determined by determining the relative advance of the refill 5 by measuring the relative 1 advance of the piston block 31 with respect to the abrading unit 21 or any other appropriate fixed reference on the device. In other words, the release of a "dose" of foodstuff simply depends on the distance traveled by the refill 5 or by the piston block 31. For example, "x" grams of powdered foodstuff, needed to produce a beverage of a given concentration, will correspond to a distance "y" covered by the piston block 31. The distance "y" needed to provide "x" grams of powdered foodstuff can be readily calculated from the dimensions and mass per unit volume of the refill 5.

The amount of abraded foodstuff can be also determined by measuring the mass of foodstuff released and collected. In this instance, the device further comprises a balance 60, or other means to measure the mass, on which the collector 7 rests. By measuring the mass of powdered foodstuff in the collector 7 provides an indication as to whether to continue or stop the abrading and longitudinal-pushing cycle. Once the desired mass of foodstuff has been deposited into the collector 7 a signal is sent to a central control unit that stops the abrading and longitudinal-pushing cycle.

Figure 7:
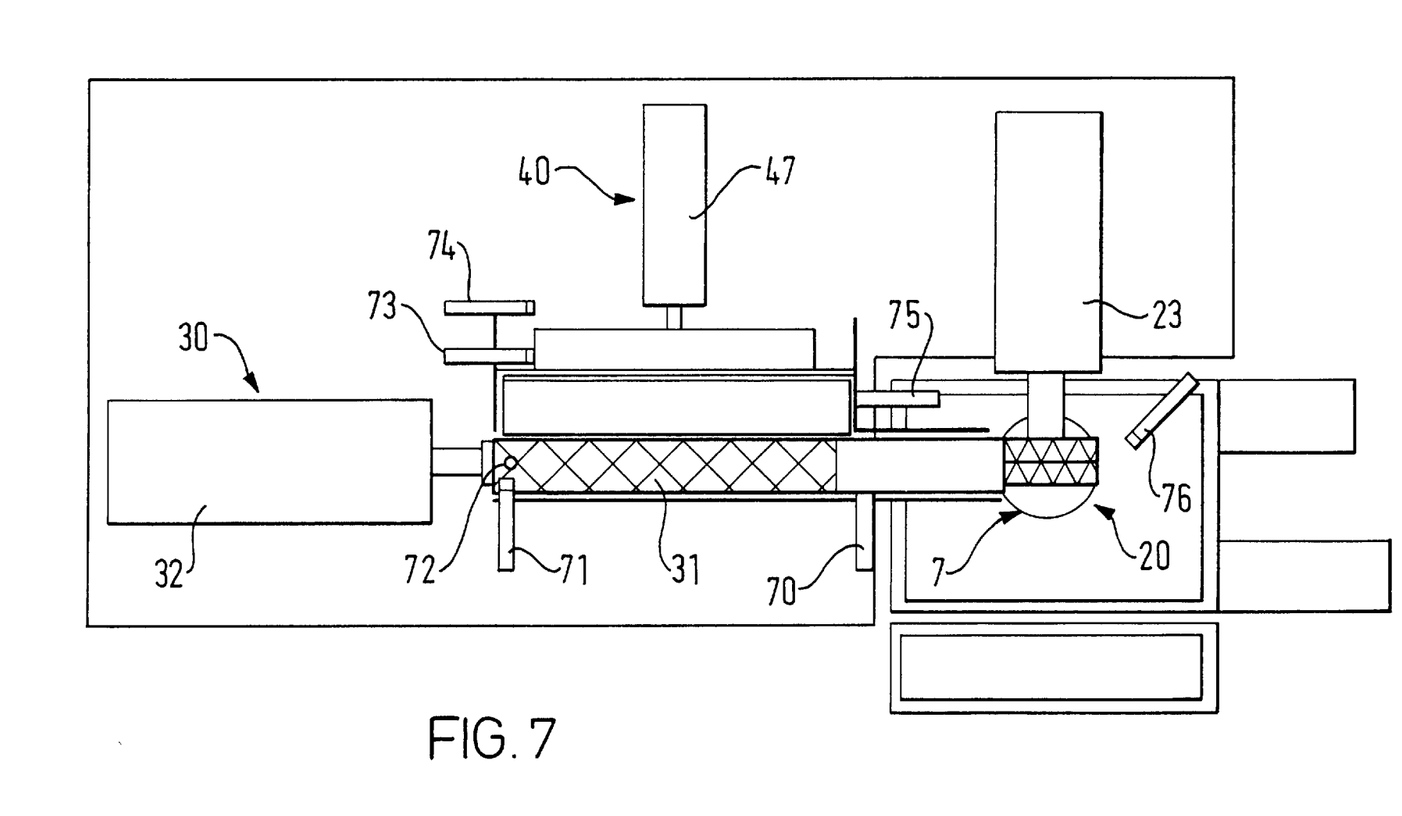
FIG. 7 is a diagrammatic view of the device for preparing a beverage according to the invention depicting the arrangement of the detection system.

FIG. 7 illustrates the position of the detection means of the device. Detecting the advance of the refill 5 through the abrading unit is performed by a first detection element 70 located near the abrading unit 20 which is able to send a signal to a control system (not depicted) to activate a program for loading a new refill 5 into the abrading unit. The detection element 70 may be, for example, of the inductive type and is activated when a source element 72, attached to the piston block 31, passes the detection element 70. The source element may conveniently be a metal pellet. A second stationary detection element 71, also of the inductive type, is situated downstream from the first element 70 (i.e., further away from the abrading element) and is activated when the piston block 31 reaches a retracted position. When the source element 72 moves past the second detection element 71. The second detection element 71 sends a signal to a control device that the piston block 31 is oriented in the correct position for a new refill 5 to be placed along axis "I." Two detection elements 73, 74, of the same type as the previous ones, are oriented parallel to each other and adjacent to the direction of movement of piston block 45 of the feed unit 40 to assure that the piston block 45 is in the correct position relative to opening 49 of the reservoir 41 during various stages of the feed cycle.

A detection element 75, preferably of an optical type, can be used to provide information on the presence of a refill 5 in the opening 49 of the reservoir. A detection element, preferably of the optical type, can also be used to provide information on the presence of a collector 7 under the abrading device 20.

Numerous variations and features may be introduced into the device without departing from the scope of the invention. For example, one could envisage the pressing means 30 being replaced by a different type of mechanical means, for example, a concentric pushing means such as a cam.

Figure 14:
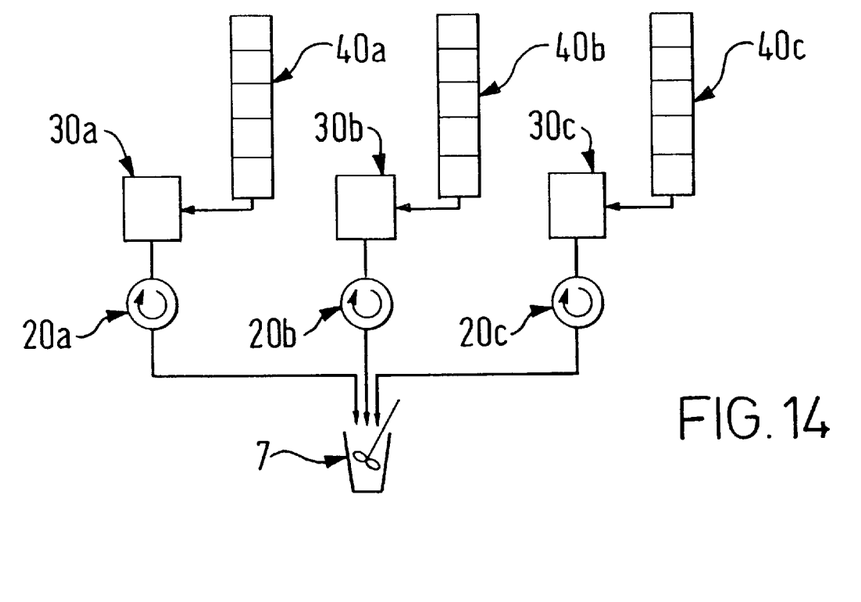
FIG. 14 is a schematic depicting a second embodiment of device for preparing a beverage according to the invention.

It is also possible to envisage a more complicated device by installing a series of units mounted in parallel so as to allow several types of beverages or sauces to be produced, or to permit more than one foodstuff to be combined in desired proportions. FIG. 14 illustrates this principle. The device comprises three distinct units each comprising a feed unit 40a, 40b, 40c, a pressing unit 30a, 30b, 30c, and an abrading unit 20a, 20b, 20c. The three series communicate with a common collector 7, such as a cup or an intermediate mixing chamber. In one embodiment the abrading units are advantageously connected so that they can be engaged selectively with a motor that is common to all the units.

The principle of operation of the device may be described by the following representative algorithm. There is an automatic or manual mode of selection. In automatic mode, the main program comprises the following stages:

(1) Check that piston block 31 is in the withdrawn position, piston block 31 is in the withdrawn position when detection cell 71 is activated, (2) Check that piston block 45 is in the withdrawn position, piston block 45 is in the withdrawn position when detection cell 74 is activated, (3) Begin the program to load a refill 5 and to activate the motor of the abrading unit, or send an error message if the positions at stage (1) and (2) are abnormal, (4) Check, by means of an optical detector, that there is a cup present, and zero the balance, (5) Activate the pressing ram 32, (6) Checking the weight of abraded foodstuff, when the desired weight of the foodstuff is obtained deactivating the pressing ram, (7) Check the maximum advance of the pressing ram 32, (10) If maximum advance has not been reached, repeat from (4), (11) If maximum advance has been achieved, repeat from (1).

The device of the invention simplifies the operations of refilling, servicing and maintaining the device compared to conventional dispensing devices. Furthermore, the device of the invention avoids the agglomeration of powders that form lumps as a result of heat and moisture. Similarly, by using compacted refills the device of the invention reduces oxidation of the foodstuffs so that the aroma and flavor is preserved and only given off when the foodstuff is reconstituted with the liquid. The device of the invention also eliminates the production of "fines," which form in devices that use "bulk" powdered foodstuffs. Also, the device of the invention is less bulky than devices that use "bulk" powdered foodstuffs. In particular, the device of the invention reduces the space required for storing the foodstuff used to make the beverages, without reducing the service capacity of the device. Finally, the device of the invention allows the refills to be shaped so that they are specifically tailored to the device and accordingly reduces the risk that inappropriate or low-quality foodstuffs will be introduced into the device.

The invention also relates to the method for preparing a beverage based on a water-dispersible product. The method includes the steps of providing a solid refill of a compacted water-dispersible foodstuff, abrading or cutting an amount of the refill to provide an abraded foodstuff and mixing the abraded foodstuff with a volume of liquid to provide the beverage.

The invention also relates to the foodstuff refill intended to be used in the device. The refill may be in the form of pellets, plugs, tablets, or any other appropriate form so long as the device can process the form of the refill. Preferably the refill is in the form of a stick or a bar. A bar with a square or rectangular cross section is technically the most practical since it allows for easy stacking in the reservoir and easy movement, guidance, and processing.

It is essential that the refills can be abraded or cut into an abraded foodstuff that is in the form of solid residue of powder, granules, flakes, or chips that can be dispersed in a liquid medium. The size of the abraded foodstuff may vary according to the nature of the foodstuff and its ability to be dispersed in the liquid medium when reconstituting the beverage. The term "dispersible," as used herein, mean that the residue is soluble or partially soluble in the liquid. In some instances, the product may contain small particles or inclusions that are not soluble in the liquid, such as spices, fats, condiments, or dried herbs, for example. The liquid may be an aqueous medium, as in the case of beverages and preparations of the soup type or, in the case of sauces or other culinary preparations, a fatty liquid medium or an emulsion of the oil-in-water or water-in-oil type. Preferably the liquid is an aqueous medium. The liquid may be heated, may be at room temperature, or may be refrigerated.

The refill comprise foodstuffs from compactable pulverulent compositions that are based on powders or agglomerates of concentrates of soluble coffee, cocoa, milk, chicory, soups, sauces, and the like. The foodstuff may also be based on compositions containing fruit that can be reconstituted in a liquid medium. The fruit may be sweetened and/or may be a source of energy. By pulverulent composition is meant a composition in the form of a powder. By compactable is meant that the pulverulent composition can be compressed together to form a single article. The materials may be partially or fully dehydrated, freeze dried compactable materials. It is preferable to use base powders obtained by a spray drying process. Spray drying of coffee extract is well known to produce instant coffee powder. The process consists of preparing soluble coffee by spray drying a concentrated aqueous coffee extract obtained from roast and ground coffee, in a drying tower, through a high spray nozzle pressure which causes to deliver a spray over a wide area in the form of small droplets and evaporating the droplets to a high coffee solid content. The spray drying method is described in numerous patents such as, for instance, U.S. Pat. Nos. 4,368,100, 4,474,820, and 4,794,010.

For economical reasons, it is not necessary for the powder to be put through an agglomeration process, which is generally performed when producing finished products such as soluble coffee. Although a product that has been spray dried and then agglomerated may be used. Agglomeration of coffee powder consists of compacting coffee particles to form clusters of particles. The agglomeration process may be part of the spray drying process or performed as a separate step subsequent to spray drying of the coffee extract. Numerous patents describe agglomeration of coffee or milk powder according to different techniques, such as U.S. Pat. No. 2,977,203, U.S. Pat. No. 3,615,669, U.S. Pat. No. 3,716,373, GB 1,276,437; GB 2,006,603, U.S. Pat. No. 4,368,100, U.S. Pat. No. 4,594,257, and U.S. Pat. No. 4,594,258. Powders, such as soluble coffee powder, obtained by freeze drying, may also be used.

For coffee refills it is preferably, that the coffee powder is obtained from atomized soluble coffee and that the refill has a mass per unit volume of between 200 and 250 g/liter, preferably 225 to 235 g/liter. It is preferably that refills based on soluble coffee also have a moisture content of from about 3.5 to 5%, more preferably about 4%. Such a coffee refill provides an abraded foodstuff with finer particles that are more readily soluble in the liquid and less likely to soil the abrading device compared to a refill with a moisture content in excess of 5%. For example, a coffee product with a 6% moisture content produces far more particles having a size that are more difficult to reconstitute in water so that a mixer is needed to help reconstitute the abraded foodstuff. Consequently, the preparation time is increased.

Figure 8:
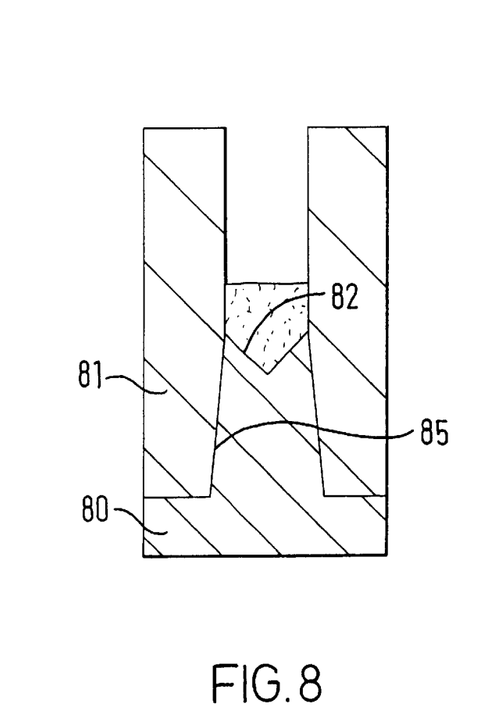
FIG. 8 is a diagrammatic sectioned view depicting the first phase of a method of manufacturing a refill for use in the device of the invention wherein an amount of product or granules is poured into a compression device.
Figure 9:
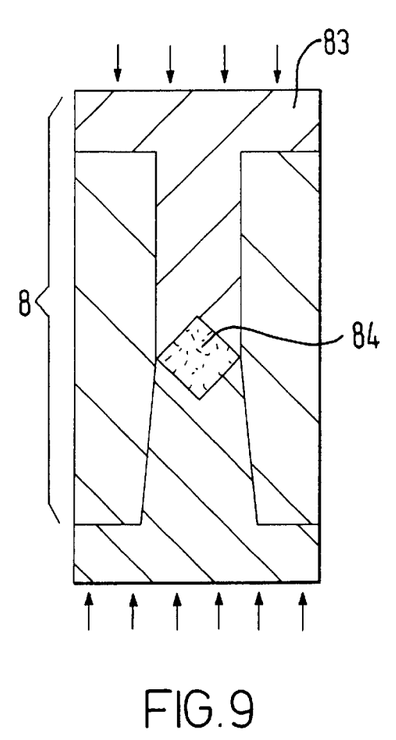
FIG. 9 is a diagrammatic sectioned view depicting the second phase of a method of manufacturing a refill for use in the device of the invention wherein the amount of powder is being compressed.
Figure 10:
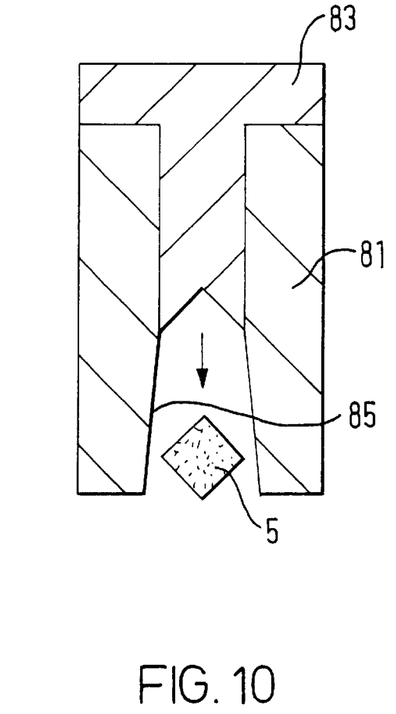
FIG. 10 is a diagrammatic sectioned view depicting the third phase of a method of manufacturing a refill for use in the device of the invention wherein the compressed refill is being extracted.

Refills can be manufactured by various methods known to those of ordinary skill in the art. FIGS. 8 to 10 illustrate a preferred method to manufacture the refills by mechanical compression. According to this method a mechanical press 8, capable of compressing a foodstuff to a pressure of from about 20 MPa to 50 MPa is used. As shown in FIG. 8, an amount of powder or granular foodstuff, such as, for example, a powdered coffee or soluble agglomerate, is introduced into a housing formed by a subassembly comprising a lower cavity 80 and a mold body 81. The powdered foodstuff, in the case of soluble coffee, for example, typically has a mass per unit volume of about 0.2 to 0.25 g/cm$^3$. The lower cavity 80 includes a pattern 82 that has the shape of a half diamond. The press is closed by means of an upper cavity 83 that also has a pattern 84 having the shape of a half diamond that is substantially symmetric with the pattern 82 in the lower plate, as shown in FIG. 9. Pressure is applied by a press for a sufficient length of time to compact the foodstuff into a brick. The lower cavity 80 is then opened to release the compressed refill 5. Preferably edges 85 of the body of the press 81 are slightly flared at the bottom to facilitate removing the refill. The shape of the cavities 80 and 83 are also designed to facilitate releasing the refill.

The compression factor varies depending on the nature of the foodstuff. The compression factor is typically from about 3 to 5, i.e., the volume of a given mass of foodstuff in the compacted form is about ⅓ to ⅕ of an equivalent mass in the powdered form. The mass per unit volume of the refill is of the order of 0.75 to 1.65 g/cm$^3$. The refill is thus, three to five times less bulky than an equivalent amount of foodstuff in powdered or granular form, which has a mass per unit volume which is generally from about to 0.2 to 0.25 g/cm$^3$.

By way of example, if soluble coffee is the foodstuff, the mass per unit volume of the refill is typically from about 1 to 1.3 g/cm$^3$. The standard soluble coffee concentration in a beverage is generally from about 1 to 1.7% by weight, i.e., from about 1.5 to 2.5 g per 150 ml of water. This means that for a refill weighing about 30 g, about 12 to 150 ml instant coffees per refill can be served.

Various factors may influence the ability to compact the foodstuff. In particular, the most important factors are the nature of the foodstuff, the pressure, the temperature of the foodstuff during compacting, the relative moisture content of the foodstuff, and the presence of additives or binders in the foodstuff that can facilitate binding, such as fats and oils, for example.

Additives that enhance the flavor or aroma may also be added to the foodstuff that is being compacted. For example, coffee aromas or the like in an aqueous or oily phase may be added. Similarly, flavors or aromas in the form of capsules may be added. The capsule support may be maltodextrin, for example.

It has been found that, in the case of atomized soluble coffee, a coffee temperature of at least about 50° C., preferably of the order of 65° C. ±2° C., is needed to manufacture refills having a relative moisture content of about 4%. Below this temperature, the resulting refill is too friable and, thus, is difficult to store. If the relative moisture content is increased it is necessary to work at lower temperatures to avoid agglomeration which makes molding difficult. For example, for a relative moisture content of about 6% in the case of soluble coffee, the ideal temperature is 20° C. An excessive moisture content, however, tends to produce a refill that soils the abrading tool when the refill is abraded.

Temperature regulation of the foodstuff may be achieved either in an oven or a chamber in which the pulverulent foodstuff is conditioned before it is charged into the mold. Preferably, the compression mold is heated to the optimum processing temperature. As a general rule, the temperature of the foodstuff during processing is from about 20 to 80° C. The actual temperature, however, depends on the type of foodstuff that is being manufactured into a refill.

Figure 13:
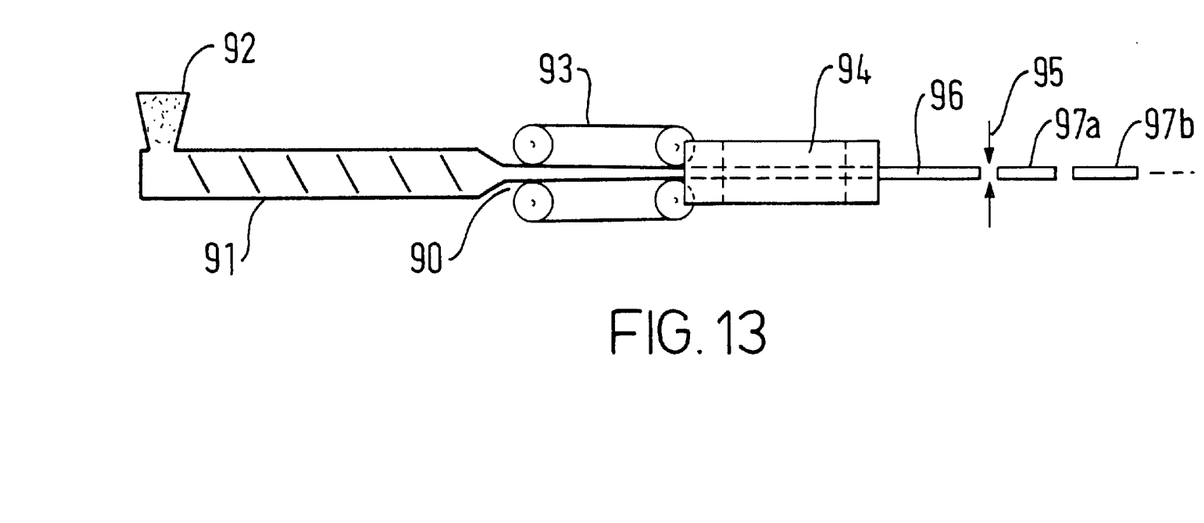
FIG. 13 is a schematic depicting a second method of manufacturing a refill for use in the device of the invention by extrusion and rolling in at least two directions.

Another method to manufacture a refill is illustrated in FIG. 13. The method involves forming, bars, sticks, or any other shape by an extrusion/rolling technique. According to the method materials of the pulverulent foodstuff 92, such as a powder that forms the basis for a soluble coffee obtained by atomization, is added to a single-screw or twin-screw extruder 91 and is extruded as a continuous strip 90. On leaving the die, the continuous strip or extrudate 90, undergoes rolling in a first direction by a first roller 93 followed by rolling in a second direction by a second roller 94. Preferably, the second roller 94 is oriented substantially perpendicular to the first roller 93. Preferably, the rollers 93, 94 are funnel shaped, with a wider inlet, so that there is a reduction in cross section of the strip as it is rolled and converted to the desired shape. The speed of rotation of the rollers are chosen to be slightly higher than the extrusion rate to compensate for the reduction in cross section of the strip. Rollers 93, 94 are arranged so that when the strip exits the first roller 93 it enters the second roller 94 almost immediately. Preferably there is a partial overlap between the first roller 93 and the second roller 94. The rolling is performed in such a way as to produce a continuous rolled strip 96 with a substantially uniform mass per unit volume and acceptable dimensional tolerances. The conditions for extruding and rolling are adjusted to avoid vitrification of the product, i.e., fusing of the foodstuff to form a glassy substance, which can lead to solubility problems and difficulty in reconstituting the abraded foodstuff in the liquid. The strip 96 is then cut into sections (97a, 97b) of desired length by means of a cutting tool 95. This method can be used to form co-extruded refills having at least two parts, each of a different foodstuff. For example, the refill may contain a first foodstuff based on soluble coffee, and a second foodstuff based on soluble compacted powdered milk. Such a refill could be used for reconstituting beverages such as cappuccino, "cafe au lait," and the like.

Figure 15:
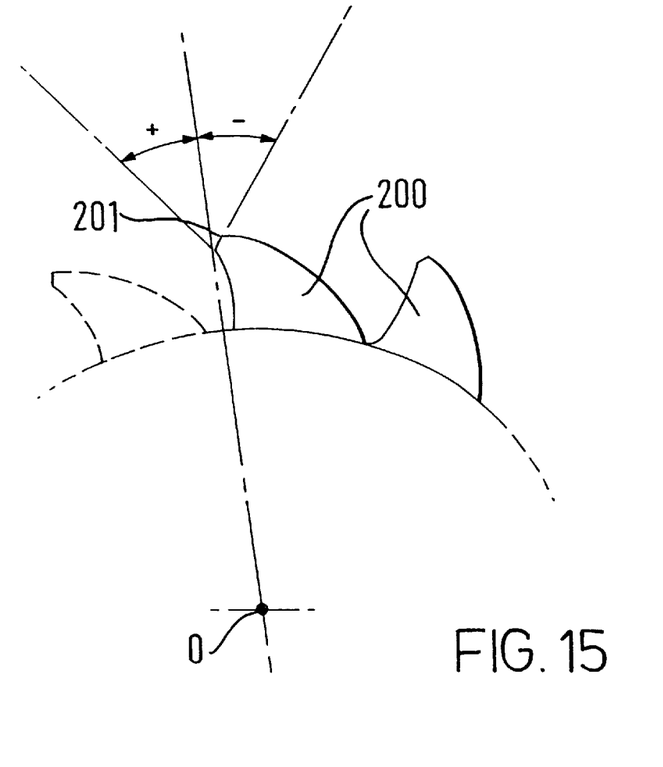
FIG. 15 depicts the preferred profile of the cutting tool.

FIG. 15 shows a profile of the cutting tool useful for cutting strip 96 into sections 97 that provides satisfactory results. On its periphery, the tool has a series of teeth 200 comprising an attack portion 201 that makes a negative cutting angle. The portion with a negative cutting angle makes it possible to cut strip 96 without forming a volatile dust. The cutting angle is, by definition, the angle between the surface of the attack portion 201 and a radial line passing through the cutting end point as shown in FIG. 15.

Figure 16:
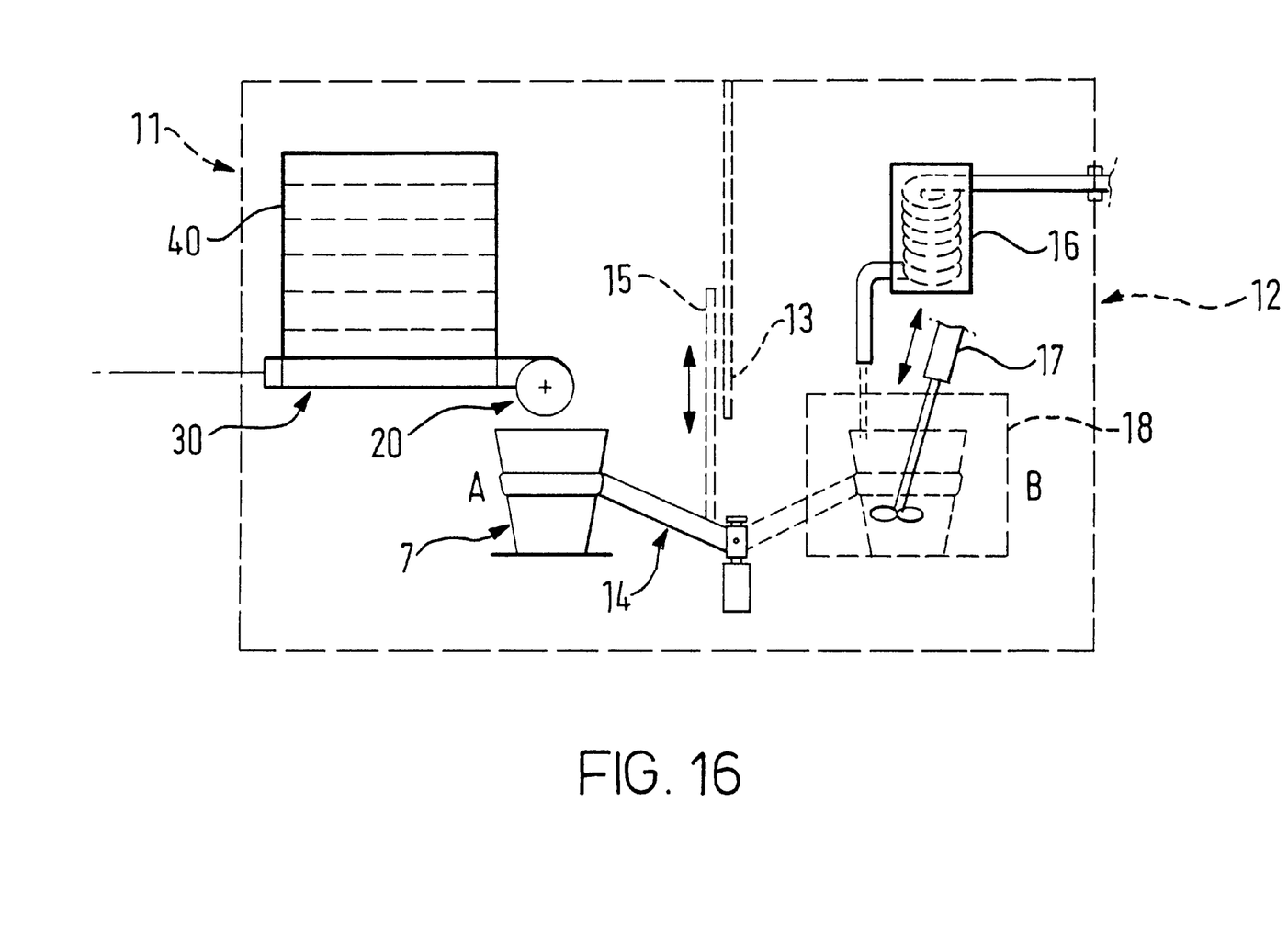
FIG. 16 diagrammatically depicts a drink dispenser according to the invention having a separate dry zone and wet zone.

FIG. 16 illustrates an exemplary arrangement of the device of the invention in the chamber an automatic dispensing machine. In this arrangement the area in which the abraded residue is produced, the so-called "dry zone" 11, is separated from the area in which the abraded foodstuff is mixed with the liquid, the so-called "wet zone" 12. Preferably, zones 11 and 12 are separated to avoid water vapor and splashes from passing from the wet zone 12 to the dry zone 11. Thus, a vapor barrier 13 may advantageously be installed between the two zones. The dry zone 11 may also be isolated from outside moisture by appropriate isolating means. Such an arrangement prevents the refills from absorbing moisture so that the mechanical properties of the refills remain uniform and homogenous. Accordingly the abraded foodstuff is delivered in a constant quantity and is of reproducible quality. The abrasion unit 20, pressing unit 30 and storage unit 40 are placed in the dry zone 11. The collector 6, for example, a cup, is arranged vertically in line with the abrading unit so as to collect the abraded foodstuff. The collector 7 is then conveyed to the wet zone 12 by a conveyor device 14. The conveyor device 14 takes hold of the collector 7 and moves it from a position where it collects the abraded foodstuff (position A) to a position in the in the serving chamber 18 of the wet zone 12 (position B). Once in position B, the preparation of the beverage is completed by the addition of liquid. Any means available to those of ordinary skill in the art may be used to convey the collector 7 from position A to position B. For example, the conveyor could comprise an arm, articulated in one or more directions. Optionally, opening means, such as a hatch 15 that can be automatically opened on command may be installed between the two zones 11 and 12. In the case of a hot beverage, a heating unit 16 is placed in the wet zone 12 and connected to a liquid supply to heat the liquid to the desired temperature. The mixture of abraded foodstuff and liquid can optionally be mixed by a mixer 17. The complete cycle for preparing the final beverage product is of course managed by control means (not depicted). Such control means are readily known to those of ordinary skill in the art.

Various modifications of the invention in addition to those described herein will be apparent to those skilled in the art from the foregoing description. Such modifications are also intended to fall within the scope of the appended claims. The foregoing disclosure includes all the information deemed essential to enable those skilled in the art to practice the claimed invention.

What is claimed is:

1. A device for preparing beverages comprising one or more pressing units for urging one or more solid refills of a water-dispersible foodstuff along a guide surface that directs the refill in a first direction along a first axis towards one or more abrading devices so that the refill contacts the abrading device and the abrading device abrades the refill to provide an amount of powdered foodstuff, a collector to collect the powdered foodstuff, and a liquid supply to provide one or more liquids to be mixed with the powdered foodstuff.

2. The device of claim 1, wherein the abrading device is a rotary element comprising an abrading surface that is substantially cylindrical in shape with an axis of rotation that is substantially perpendicular to the first direction.

3. The device of claim 2, wherein the rotary element has a diameter of 25 to 35 mm and rotates at between about 200 and 2060 rotations per minute.

4. The device of claim 2, wherein the guide surface is positioned above the axis of rotation of the rotary element.

5. The device of claim 1, wherein the abrading device has a planar surface provided with a rectlinear motion that is substantially perpendicular to the first direction.

6. The device of claim 4, wherein the rectlinear motion is provided by an abrasion strip supported by rollers.

7. The device of claim 1, further comprising a feed unit for continually providing a refill to the pressing unit.

8. The device of claim 7, wherein the feed unit is positioned adjacent to the pressing unit and provides a refill onto the guide surface along the first axis after the pressing unit has retreated by a sufficient length so that a refill can be positioned between the pressing unit and the abrading device.

9. The device of claim 8, wherein the feed unit comprises a reservoir and a transverse pushing member, wherein the reservoir is capable of containing one or more refills stacked vertically on top of each other and aligned substantially parallel to and adjacent to the first direction and comprising an opening to allow the lowermost refill in the vertical stack to be urged by the transverse pushing member in a second direction perpendicular to the first direction to position the lowermost refill on the guide surface along the first axis.

10. The device of claim 8, further comprising a detection element to determine when the pressing unit has retreated by a sufficient length.

11. The device of claim 1, wherein the collector is a removable serving container.

12. The device of claim 1, further comprising a mixing chamber to mix the powdered foodstuff and the liquid before the powdered foodstuff and liquid is deposited in the collector.

* * * * *